March 19, 1929.  H. SCHMITT  1,705,648

PISTON RING

Filed March 22, 1919

Inventor:
Henry Schmitt,
By
Attorneys

Patented Mar. 19, 1929.

1,705,648

UNITED STATES PATENT OFFICE.

HENRY SCHMITT, OF DETROIT, MICHIGAN, ASSIGNOR, BY DIRECT AND MESNE ASSIGNMENTS, OF ONE-HALF TO McQUAY-NORRIS MANUFACTURING COMPANY, OF ST. LOUIS, MISSOURI, A CORPORATION OF DELAWARE, AND ONE-HALF TO NO-LEAK-O PISTON RING COMPANY, OF MUSKEGON, MICHIGAN, A CORPORATION OF MARYLAND.

PISTON RING.

Application filed March 22, 1919. Serial No. 284,360.

This invention relates to a piston packing and more particularly to a packing ring especially adapted for the pistons of internal combustion engines. The object of the invention is to prevent leakage past the piston by maintaining a tight joint after continued use and consequent wear, and further by providing a simple and efficient means for closing the joint between the ends of the packing ring.

With these and other objects in view, the invention consists in the matters hereinafter set forth and more particularly pointed out in the appended claims, reference being had in the accompanying drawing in which Figure 1 is a longitudinal section of a cylinder showing a piston therein provided with packing rings embodying the invention;

As illustrative of the invention, A indicates the wall of a cylinder, B the wall of a piston therein having one or more grooves C to receive a packing ring 1 formed of a width to fit closely but freely slidable therein.

Figure 1:
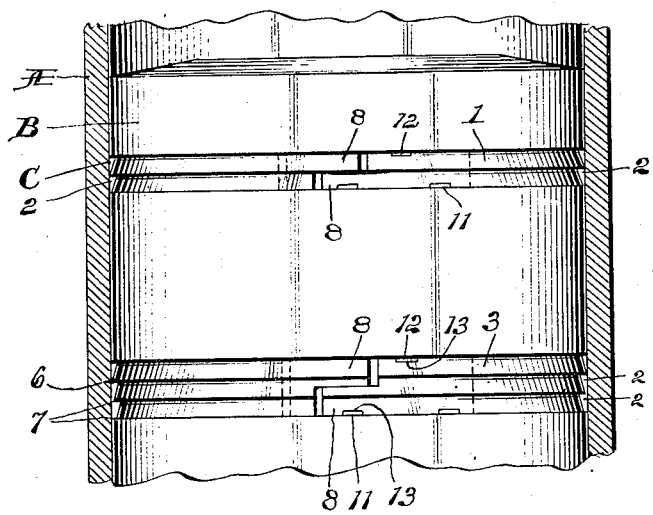
Figures 2, 3:
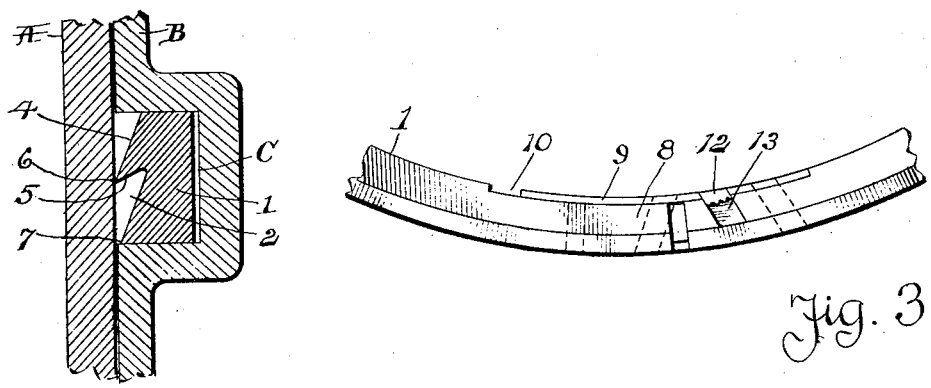
Fig. 2 is an enlarged sectional detail showing a portion of the cylinder wall, piston and packing ring in section.
Fig. 3 is a plan view of a portion of the ring.
Figure 4:
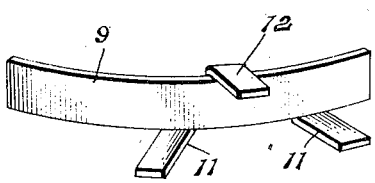
Fig. 4 is a perspective view of a joint member for closing the joint between the ends of the ring.

This ring is formed with a single annular groove 2 in its outer face as shown at 1 in Fig. 1 or it may be formed with a plurality of like grooves as shown at 3 in the same figure. The walls 4 and 5 of the grooves meet in the plane of the outer face of the ring to form an angle 6, the wall 5 being preferably undercut to form an acute angle providing a comparatively sharp annular edge to engage the wall of the cylinder and the wall 4 meets the lower end face of the ring as in the ring indicated at 1, or the wall 5 of the next groove below, as in the ring 3, to form a sharp angle 7 lying in a plane slightly inside of the plane of the angle 6 which angle 7 will be out of contact with the wall of the cylinder when the ring is new, but as the angle 6 wears away in use, the angle 7 comes into contact with the cylinder wall presenting a comparatively sharp shoulder which will form a tight joint The angle 6 being the only point of contact when the ring is new and this being a comparatively sharp angle or line contact, will quickly conform to the cylinder wall and form a very tight joint. As soon as the angle 6 wears away slightly in use, the second angle 7 becomes operative to make a tight joint and the surface formed by the wearing away of the angle 6 then forms a contact surface which will prevent the rapid wearing away of the lower angle 7. Any desired number of grooves may be provided, the annular contact angles thus formed being each of slightly less diameter than the one above so that as one wears away the next below will come into contact with the cylinder wall, and thus there will always be a comparatively sharp annular lower shoulder opposed to the cylinder wall to form a tight joint therewith.

The acute angles formed by the meeting walls of the grooves will scrape the oil from the surface of the cylinder wall as it presents no extended surface to the cylinder surface, between which surfaces the oil may creep and thus hold the ring from close contact with the wall. The annular grooves also form oil pockets for the oil to provide adequate lubrication for the piston and also to seal the joint between the ring and cyilnder wall to prevent loss of compression or leakage of air, gas or combustible fluid past the ring.

To provide for the expansion of these rings within their grooves so that their annular contact angles will be held in firm yielding contact with the cylinder wall as these angles wear away, each ring is divided or split longitudinally and cut transversely in the usual manner to form overlapping tongues or ends 8, and to seal this joint, a sealing plate 9 is provided, the inner face of the end portions of the ring being cut away as at 10 to a depth equal to the thickness of the plate to receive said plate which is of a width substantially equal to that of the ring and is made fast to one end portion of the ring to overlap the outer end portion, by tongues 11 and 12 on the plate projecting from the edges thereof and bent outwardly to lie flat within grooves 13 milled in the upper and lower edges of the ring, the grooves for the tongues 11 being milled across the ring in angular relation to each other and to the radii of the ring, and the groove for the tongue 12 being also milled across the edge of the ring in angular relation to a radius line of the ring, that is the grooves are milled across the faces of the ring at angles other than substantially at right angles to the longitudinal plane of the ring so that the plate will be firmly held to the ring against inward movement by the engagement of the tongues with the grooves, the angular relation of the tongues preventing such inward movement and longitudinal disengagement of the tongues from the grooves. With this construction, the sealing plate may be cheaply made and quickly attached and the grooves quickly and cheaply formed by running a straight milling cutter across the edges of the ring.

Obviously a ring which is split or severed in any other manner than that shown may be employed and other changes in the construction falling within the terms of the appended claims may be made without departing from the spirit of the invention, and I do not therefore limit myself to the construction shown.

What I claim is:—

1. A piston ring comprising an expansible annular member formed with outwardly projecting comparatively sharp annular portions adapted to contact a cylinder wall, said sharp contact portions being arranged at different radial distances from the axis of the ring to be successively brought into contact with the cylinder wall by the wearing away of said portions in use.

2. A piston ring comprising an annular expansible member having a plurality of annular ribs on its outer face forming sharp annular contact edges of different radial distances from the axis of said ring.

3. A piston ring comprising an annular expansible member having a plurality of annular grooves in its outer face meeting to form stepped annular contact edges adapted to successively contact a cylinder wall as said edges are successively worn away in use.

4. A piston ring comprising a transversely divided annular member adapted to yieldingly expand and formed with a stepped outer surface providing annular contacting edges arranged at different radial distances from the axis of the ring and adapted to successively engage a cylinder wall as said edges wear away in use, and means for spanning the space between the ends of the split member.

5. As a new article of manufacture, an expansible annular piston ring having outwardly projecting annular stepped portions adapted by wear to successively contact with a cylinder wall, said ring portions having a cross sectional configuration which gradually increases the cylinder engaging surface of the ring as said ring portions are worn.

6. An integral expansible piston packing ring having a co-axial groove, a wall of which groove intersects the outer periphery of the ring, the ring from substantially the line of such intersection to the corresponding end face of the ring, having less exterior diameter than at the said line of intersection.

7. A piston packing ring having its outer periphery constituted by a plurality of circumscribing ribs of different diameters that are each defined by outwardly convergent faces.

8. A piston packing ring having its outer periphery constituted by a plurality of circumscribing ribs of different diameters, each rib being defined by convergent faces that substantially intersect.

9. An integral expansible piston ring having its outer face tapered axially with resultant major and minor ends, and having in its major end portion a circumscribing oil-receiving groove, one wall of which groove intersects the periphery of the ring substantially at the adjacent end-face of the ring, the other wall of the groove intersecting the outer periphery of the ring at an acute angle.

10. In a piston ring, the combination with a lapped joint for maintaining the sealing of the ring ends during peripheral expansion of the ring, of a plurality of annular projections disposed about the outer periphery of the ring, one of said projections protruding farthest from the center of the ring whereby to contact with the cylinder wall first and form the sole support of the ring thereagainst in order to effect a quick conforming of said projection with said wall.

11. In a piston ring, the combination with a lapped joint for maintaining the sealing of the ring ends during peripheral expansion of the ring, of two annular projections disposed about the outer periphery of the ring, the outer peripheries of both projections being of greater radii than that of the ring proper, and the outer periphery of one projection being of greater radius than that of the other.

12. In piston ring construction, a split ring of the overlapping joint type, said ring having its external periphery formed of annular wear zones in spaced-apart relation, the maximum radius of one of said zones being greater than the similar radius of a second zone to permit zonal activity by stage development, the zone of greatest radius having its initially-active face intermediate and spaced from the sides of the ring.

13. In piston ring construction, a split ring of the overlapping joint type, said ring having its external periphery formed of annular wear zones in spaced-apart relation, the maximum radius of one of said zones being greater than the similar radius of a second zone to permit zonal activity by stage development, the zone of greatest radius having its initially-active face located approximately central of the width of the ring.

14. A device of the character described comprising a resilient split oil saving ring formed with two substantially reduced circumferentially disposed edge portions both adapted to bear upon the surface of a cylinder and in one movement of a piston to which the ring may be attached to scrape the cylinder wall, both of said edge portions terminating in upwardly and inwardly inclined walls, the upper end of the lower inclined wall terminating at the bottom surface of the upper bearing portion to therewith form a correspondingly shaped circumferential groove, and the upper inclined wall terminating at its upper end at the upper surface of the ring, the inclined portions being adapted in the return movements of the piston to cause the oil on the cylinder face to first pass below the upper bearing portion and into the said circumferential groove, and then out of said groove and below the ring to be scraped from the cylinder wall.

In testimony whereof I affix my signature.

HENRY SCHMITT.